United States Patent
Kameda et al.

(10) Patent No.: US 6,632,569 B1
(45) Date of Patent: Oct. 14, 2003

(54) CARBONACEOUS MATERIAL FOR ELECTRODE AND NON-AQUEOUS SOLVENT SECONDARY BATTERY USING THIS MATERIAL

(75) Inventors: Takashi Kameda, Ibaraki (JP); Tadashi Ishihara, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/447,267

(22) Filed: Nov. 23, 1999

(30) Foreign Application Priority Data

Nov. 27, 1998 (JP) ............................. 10-336796
Mar. 25, 1999 (JP) ............................. 11-080904

(51) Int. Cl.⁷ ............................................. H01M 10/24
(52) U.S. Cl. ..................................... 429/231.8; 252/502
(58) Field of Search .................... 252/502; 423/414; 429/231.8, 231.95, 188, 324

(56) References Cited

U.S. PATENT DOCUMENTS

| | | | |
|---|---|---|---|
| 5,340,670 A | * 8/1994 | Takami et al. | 429/194 |
| 5,344,724 A |   9/1994 | Ozaki et al. | 429/94 |
| 5,716,732 A |   2/1998 | Imoto et al. | 429/122 |
| 5,906,900 A | * 5/1999 | Hayashi et al. | 423/445 R |

FOREIGN PATENT DOCUMENTS

| | | |
|---|---|---|
| EP | 0 549 802 A1 | 7/1993 |
| EP | 0917228 A1 | 5/1999 |
| EP | 0935306 A1 | 8/1999 |
| JP | 10-334915 | 12/1998 |

* cited by examiner

Primary Examiner—Randy Gulakowski
Assistant Examiner—M. Wills
(74) Attorney, Agent, or Firm—Armstrong, Westerman & Hattori, LLP.

(57) ABSTRACT

A carbonaceous material has a plane space d002 of a (002) plane less than 0.337 nm in an X-ray wide angle diffraction method, a crystallite size (Lc) of 90 nm or higher, an R value, as a peak intensity ratio of a peak intensity of 1360 $cm^{-1}$ to a peak intensity of 1580 $cm^{-1}$ in a Raman spectrum in use of an argon ion laser, of 0.20 or higher, and a tap density of 0.75 $g/cm^3$ or higher. Also disclosed is a multi-layer structure carbonaceous material for electrode, which is manufactured by carbonizing some organic compounds where the carbonaceous material for electrode is mixed with the organic compounds. The battery using the carbonaceous material for electrode or the multilayer structure carbonaceous material for electrode has a large capacity, a small irreversible capacity admitted in the initial cycle, excellent capacity maintaining rate of the cycle, and particularly, largely improved quick charging and discharging characteristics.

20 Claims, No Drawings

CARBONACEOUS MATERIAL FOR ELECTRODE AND NON-AQUEOUS SOLVENT SECONDARY BATTERY USING THIS MATERIAL

TECHNICAL FIELD

This invention relates to a carbonaceous material for electrode and a non-aqueous solvent secondary battery using this material. More specifically, this invention relates to a carbonaceous material for electrode capable of constituting a non-aqueous solvent secondary battery having adequately quick charging and discharging property, more preferably, to a carbonaceous material for anode.

RELATED ART

According to recent trends rendering electronics apparatuses further compact, secondary batteries are required to have a large capacity. Lithium secondary battery specially has been received attentions as having a higher energy density in comparison. with nickel-cadmium batteries and nickel-hydride batteries. As a material for making an anode, use of a lithium metal was tried at an initial stage, but it was turned out that the lithium was deposited in a resin shape (dendrite shape) during repeating of charging and discharging and might reach the cathode in penetrating a separator, thereby raising a risk that the anode and the cathode are short-circuited. Therefore, carbonaceous materials that can prevent dendrite from occurring have been receiving attentions instead of metal electrodes.

As a non-aqueous electrolyte secondary battery using a carbonaceous material a battery in which a non-graphitizable carbonaceous material having a low crystallinity is used as an anode material first has been made commercially available. Subsequently, a battery using a graphite group having a high crystallinity has been made commercially available, and this situation is going on. The electrical capacity of graphite is 372 mAh/g, maximum theoretically, and a battery having a large charging and discharging capacity can be obtained by proper selection of electrolytes.

Some carbonaceous material having a multilayer structure, as shown in Japanese Unexamined Patent Publication (KOKAI) Heisei No. 4-171,677 also has been studied. This is based on a theory that, in combination of an advantage of the graphite having a high crystallinity (large capacity and small irreversible capacity) and a disadvantage (decomposition of a propylene carbonate type) and an advantage of the carbonaceous material having a low crystallinity (good stability in an electrolyte) and a disadvantage (large irreversible capacity), the advantages are mutually utilized while the disadvantages are compensated.

The graphite groups (graphites and multilayered carbonaceous materials containing graphite) have a high crystallinity in comparison with the non-graphitizable carbonaceous material and a high true density. Where the anode is structured of carbonaceous materials of those graphite groups, high electrode filling property is obtainable, and the battery can have a higher volume energy density. It is general, in a case where graphite powders constitute an anode, that a slurry is produced upon addition of a dispersion medium where powers and binders are mixed and is coated on a metal foil as a current collector and thereafter the dispersion medium is dried. During this process, it is also general to provide a step of compression molding to press the powders to the current collector, to unify the thickness of the electrode plate, and to improve the capacity of the electrode plate. With this compression molding, the plate density of the anode is improved, and the energy density per volume of the battery is further improved.

The general graphite materials, having a high crystallinity, industrially available, however, have particle forms of a flaky shape, crystalline (or scale-like) shape, or plate shape. The reason that the particle forms are in a flaky shape, crystalline shape, or plate shape is thought that carbon crystallization mesh surface grows accumulatively in a single direction to form graphite crystallization graphite. Where those graphite materials are used for an anode of the non-aqueous solvent secondary battery, the materials indicate small irreversible capacity and large discharging capacity due to a high crystallinity, but the materials show a lower capacity in rapid charging and discharging in a high current density because crystal edge surfaces, at which lithium ions can enter and exit, exist in a small amount where the particle forms are in a flaky shape, crystalline shape, or plate shape while basal surfaces not involving entry and exit of the lithium ions exist in a large amount. Where the graphite particles are made into electrode plates through the step of manufacturing the plates, the plate density may increase, but on the other hand, because particle spacing is not adequately ensured, the lithium ions are disturbed from moving, so that the rapid charging and discharging ability as a battery may be lowered.

Where graphite powders in a plate shape are molded in electrodes, the plate surface of the powders is arranged in parallel to the electrode plate surface with a high possibility from the influences of the slurry coating step and the plate compression step. Therefore, the edge surfaces of the graphite crystallite constituting respective powder grains are molded in a vertical positional relation to the electrode surface with a relatively high possibility. When charging and discharging are performed under such a plate situation, the lithium ions entered in and separated from the graphite upon traveling between the anode and the cathode are required to go around the powder surface once, and suffer from considerable disadvantages in terms of moving efficiency of ions in the electrolyte. Moreover, spaces left over in the electrodes after the molding are disadvantageously sealed with respect to the exterior of the electrodes because the particles are formed in a plate shape. That is, because free communication of the electrolyte to the exterior of the electrodes may be disturbed, the material raises a problem that the lithium ions are disturbed from moving.

On the other hand, graphitized materials of mesocarbon micro-beads are proposed as an anode material having a spherical shape guaranteeing spaces necessary for movements of lithium ions in the plates and are already made commercially available. Where the ratio of the edge surface is high the areas that the lithium ions can enter in the particles increase, and where the shape is spherical, selective arrangement does not occur in respective powder particles and the isotropy of the edge surfaces is maintained even after the plate compression process described above, so that good moving velocity of the ions in the electrode plates are kept. Spaces remaining in the electrodes are in a state connecting to the exterior of the electrodes on the ground of the particle shapes, and therefore, the lithium ions can move relatively freely, so that the electrode structure is applicable to quick charging and discharging. The mesocarbon micro-beads however, since having a low crystal structure level as a graphite, has a low limitation of electric capacity of 300 mAh/g, and such inferiority has been known well in comparison with graphite in a flaky shape, crystalline shape, or plate shape.

Some inventions have been conceived, in consideration of those problems, in which shapes of the graphite used for the non-aqueous solvent secondary battery are restricted. For example, in Japanese Unexamined Patent Publication (KOKAI) Heisei No. 8-180,873, an invention is disclosed in which a ratio of particles in a flaky shape to particles in a relatively non-flaky shape and the like is restricted. On the other hand, Japanese Unexamined Patent Publication (KOKAI) Heisei No. 8-83,610, in opposition to the above, describes that particles in flaky shapes are preferable.

Practical batteries require electrodes having a large electric capacity and excellently quick charging and discharging ability. However, such an electrode satisfying those demands is not yet provided. Therefore, it is strongly desired to improve the quick charging and discharging ability of the graphitized materials in a flaky shape, crystalline shape, or plate shape.

It is an object of the invention to solve the problems posed in the prior art corresponding to such long-standing demands. That is, it is an object of the invention to provide a carbonaceous material for electrode having a high electrode filling property, a high energy density, and an excellently quick charging and discharging ability.

SUMMARY OF THE INVENTION

To accomplish the above objects, as a result of diligent researches done by the inventors, the inventors have discovered that, to improve the property of the electrode, a large discharging capacity is maintained by rendering the inside of the graphite particles high crystal that where the thickness direction of the graphite particles formed in a plate shape is designed to be relatively thick and where graphite particles having a higher existing ratio of edge portions since portions near the particle surfaces, particularly, basal surfaces are rough are used, the amount of portions at which the lithium ions can enter and exit is increased, and that an electrode can have a large capacity, rapid charging and discharging property, and excellent cycle characteristics by arrangement of particles in a further isotropic form, namely, by more isotropic arrangement of the edge portions using graphite particles having a shape closer to a spherical shape and carbonaceous materials having high filling property.

The invented carbonaceous materials for electrode are accomplished based on those discoveries. The material is first characterized in having a plane space d002 of a (002) plane less than 0.337 nm in an X-ray wide angle diffraction method, a crystallite size (Lc) of 90 nm or higher, an R value, as a peak intensity ratio of a peak intensity of 1360 cm$^{-1}$ to a peak intensity of 1580 cm$^{-1}$ in a Raman spectrum in use of an argon ion laser, of 0.20 or higher, and a tap density of 0.75 g/cm$^3$ or higher. Second, the invention is characterized in employing a multilayer carbonaceous material as a carbonaceous material for electrode, which is obtained from carbonization of an organic compound after mixing the carbonaceous material having the above feature with the organic compound. Third, the invention is a non-aqueous solvent secondary battery, in which the non-aqueous solvent secondary battery has a non-aqueous solvent made of an anode containing a carbonaceous material capable of absorbing and discharging lithium, a cathode, a solute, and an organic solvent, characterized in that at least a portion of the carbonaceous material is made of a carbonaceous material or a multilayer-structured carbonaceous material having the above feature.

DETAILED DESCRIPTION OF THE INVENTION

Hereinafter, a carbonaceous material for electrode, a multilayer-structured carbonaceous material for electrode, and a secondary battery according to the invention are described.

Carbonaceous Material for Electrode

The carbonaceous material for electrode according to the invention has features in a plane space d002 of a (002) plane in an X-ray wide angle diffraction method, a crystallite size (Lc), an R value, as a peak intensity ratio of a peak intensity of 1360 cm$^{-1}$ to a peak intensity of 1580 cm$^{-1}$ in a Raman spectrum in use of an argon ion laser, and a tap density, which are in respective prescribed ranges.

That is, the carbonaceous material for electrode according to the invention has a plane space d002 of a (002) plane less than 0.337 nm in an X-ray wide angle diffraction method, and a crystallite size (Lc) of 90 nm or higher. The carbonaceous material for electrode according to the invention also can use a material having an R value, as a peak intensity ratio of a peak intensity of 1360 cm$^{-1}$ to a peak intensity of 1580 cm$^{-1}$ in a Raman spectrum in use of an argon ion laser, of 0.20 or higher, preferably 0.23 or higher, particularly, 0.25 or higher. The upper limit of the R value may be 0.9 or lower, preferably, 0.7 or lower, particularly, 0.5 or lower. The carbonaceous material for electrode according to the invention has a feature of a tap density of 0.75 g/cm$^3$ or higher. The tap density is preferably, 0.80 g/cm$^3$ or higher, and the upper limit is 1.40 g/cm$^3$ or lower, and more preferably, 1.20 g/cm$^3$ or lower.

The plane space d002 of the (002) plane in an X-ray wide angle diffraction method, and the crystallite size (Lc) are values indicating crystallization of the carbonaceous material bulk, and as the value of the plane space d002 of the (002) plane is smaller, or as the crystallite size (Lc) is larger, the carbonaceous material has a higher crystallization property. The R value, as a peak intensity ratio of a peak intensity of 1360 cm$^{-1}$ to a peak intensity of 1580 cm$^{-1}$ in a Raman spectrum in use of an argon ion laser in this invention, is an index indicating crystallization property around surfaces of the carbon particles (up to about 100 Angstroms from the particle surface), and as the R value becomes larger, the material has a smaller crystallization property, or in other words, has a crystallization condition not in order.

That is, in this invention, the carbonaceous material for electrode having the plane space d002 of the (002) plane less than 0.337 nm in the X-ray wide angle diffraction method, the crystallite size (Lc) of 90 nm or higher, the R value, as a peak intensity ratio of a peak intensity of 1360 cm$^{-1}$ to a peak intensity of 1580 cm$^{-1}$ in the Raman spectrum in use of the argon ion laser, of 0.20 or higher, has a high crystallization property but is shown as having portions near the particle surfaces rough and frequently disordered or having a high existing amount of edge portions. The carbonaceous material for electrode having a tap density of 0.75 g/cm$^3$ or higher means having a high filling rate of the electrodes and round particles shapes.

The phrase of "tap density" in this specification indicates a bulk density after 1000 time tapping, and is represented by the following formula.

Tap Density=Mass of Filling Particles/Filling Volume of Particles

A filling structure of the powdery particles can be varied depending on the size, shape, interactive force among particles of the particles, but in this specification, the tap density is used as an index for stating the filling structure in a quantitative manner.

As formulas showing tap filling behaviors, various formulas have been proposed. As an example, the following formula can be exemplified.

$$\rho - \rho_n = A \exp(-k \cdot n)$$

In this formula, $\rho$ denotes a bulk density at a final stage of filling; $\rho_n$ denotes a bulk density when filled at n times; k and A denote coefficients, respectively. The "tap density" in this specification is the bulk density ($\rho_{1000}$) at a time of tap fillings of 1000 times to a cell of 20 cm$^3$, which is deemed as the bulk density at the final stage.

The carbonaceous material for electrode according to the invention can have any property as far as the material meets those conditions. The followings, however, are favorable ranges of other properties.

The carbonaceous material for electrode according to the invention preferably has an average particle size in a range of 2 to 50 $\mu$m, more preferably in a range of 5 to 27 $\mu$m, and further preferably in a range of 7 to 19 $\mu$m. It is to be noted that in this specification the ranges include their upper and lower numbers as within the ranges.

The carbonaceous material for electrode according to the invention has a BET specific surface area less than 18 m$^2$/g, preferably 15 m$^2$/g or less, and more preferably 13 m$^2$/g or less.

The material preferably has a half value width of the peak of 1580 cm$^{-1}$ in the Raman spectrum of the argon ion laser of 20 cm$^{-1}$ or higher, and the upper limit is preferably set 27 cm$^{-1}$ or lower, particularly can be selected from 21 to 26 cm$^{-1}$. The true density of the carbonaceous material for electrode according to the invention is preferably 2.21 g/cm$^3$ or higher, more preferably 2.22 g/cm$^3$ or higher, further more preferably 2.24 g.cm$^3$.

The carbonaceous material for electrode according to the invention preferably has a mean circle degree (a rate of a peripheral length of a circle corresponding to the particle area, as a numerator, divided by a peripheral length of a projected image of the particle taken as a picture, as a denominator; when the particle image is close to a true circle, the rate comes close to 1, and when the particle image is more slim or dented, the rate becomes smaller), with respect to whole particles, of 0.940 or higher, measured with a flow type particle image analyzer in which several thousand particles dispersed in the liquid are taken as pictures one by one in use of a CCD camera and a mean shape parameter can be calculated.

The carbonaceous material for electrode according to the invention preferably has a G value as an area ratio of a peak area around 1580 cm$^{-1}$ (integrated amount of 1480 to 1680 cm$^{-1}$) to a peak area around 1360 cm$^{-1}$ (integrated amount of 1260 to 1460 cm$^{-1}$) in the Raman spectrum of the argon laser of preferably less than 3.0, and more preferably, less than 2.5, and the upper limit is not specifically determined but can be 1.0 or higher.

The carbonaceous material for electrode according to the invention can be a material produced naturally or artificially.

A manufacturing method of the carbonaceous material for electrode according to the invention is not specifically limited. Therefore, the material is obtainable through selection of the carbonaceous materials for electrode having the above characteristics using classifying means such as sieving or pneumatically classifying. The most preferable manufacturing method is a method for manufacturing carbonaceous material for electrode by modifying the carbonaceous material produced naturally or artificially in adding a kinetic energy treatment. Now, this kinetic energy treatment is described below.

The carbonaceous material as a starting material to which the kinetic energy treatment is added can be natural or artificial graphitized powders or carbonaceous powders serving as a graphite precursor. Those graphitized powders or carbonaceous powders preferably have a plane space d002 less than 0.340 run, a crystallite size (Lc) of 30 nm or higher, and a true density of 2.25 g/cm$^3$ or higher. Those powders, inter alia, preferably have the plane space d002 less than 0.338 run, more preferably 0.337 nm. The crystallite size (Lc) is preferably 90 nm or higher, more preferably 100 nm or higher. The average particle size is preferably 10 $\mu$m or higher, more preferably 15 $\mu$m or higher, further preferably 20 $\mu$m or higher, and yet further preferably 25 $\mu$m or higher. The upper limit of the average particle size is preferably 1 mm or lower, more preferably 500 $\mu$m or lower, further preferably 250 $\mu$m, and yet further preferably 200 $\mu$m.

Graphitized powders or carbonaceous powders can be used as a starting material even where having a high or lower crystallization. Because the starting material having a lower crystallization has a relatively low plane orientation and a structure not so ordered, the kinetic energy treatment tends to bring a treated material having relatively isotropic, rounded pulverized surfaces. A thermal treatment after the kinetic energy treatment may bring higher crystallization property to the material.

As a high crystallized carbonaceous material with a developed carbonaceous hexagonal meshing surface structure, among the carbonaceous materials to which the kinetic energy treatment is given, exemplified are a high orientation graphite in which the hexagonal meshing surface is largely grown in a plane orientation fashion and an isotropic high density graphite in which high orientation graphite particles are integrated in an isotropic fashion.

As a high orientation graphite, exemplified preferably are natural graphite made in Sri Lanka and Madagascar, so-called kish graphite that is deposited as carbons supersaturated from melting iron, some artificial graphite of a high graphitization.

The natural graphites are, according to the property, classified into flake graphite, crystalline (vein) graphite, and amorphous graphite (see, graphite section of "Funryutai Process Gijyutu Syusei" [Technology Integration of Particle and Powder Processes], Sangyo Gijyutsu Center K.K., (1974), and "Handbook of Carbon, Graphite, Diamond and Fullerenes", Noyes Publication.). In terms of graphitization, the crystalline graphite has 100%, the highest degree; the flake graphite has 99.9%, the second highest; the amorphous graphite however has 28%, low degree. The flake graphite as a natural graphite is made in Madagascar, China, Brazil, Ukraine, Canada, and so on, and the crystalline graphite is mainly made in Sri Lanka. The amorphous graphite is made mainly in Korean Peninsula, China, Mexico and so on. The amorphous graphite, among those natural graphites, generally has smaller particle sizes and has a low purity. To the contrary, the flake graphite and the crystalline graphite have advantages such as low graphitization and a low impurity amount, and therefore, those graphites can be preferably used in this invention.

The artificial graphite can be manufactured by heating petroleum cokes or petroleum pitch cokes at a temperature of 1500 to 3000° C. or higher in a non-oxidizing atmosphere. In this invention, any artificial graphite can be used as a starting material as far as it shows a high orientation and a high electrochemical capacity after the kinetic energy treatment and the thermal treatment.

The kinetic energy treatment to those carbonaceous materials is to be made so that the average particle size ratio before and after the treatment becomes one or less. The phrase "average particle size ratio before and after the treatment" is an amount of the average particle size after the treatment divided by the average particle size before the treatment. The average particle size, herein, is given from a particle size profile based on volume measured by a laser type particle size profile measurement apparatus. When a profile is measured by such a laser type particle size profile measurement apparatus, a particle size profile is obtainable in converting any particles, even particles having anisotropic shapes, into particles having substantially spherical shapes upon averaging the sizes in an isotropic manner.

In the kinetic energy treatment performed for manufacturing the carbonaceous material for electrode according to the invention, the average particle size ratio before and after the treatment is set one or less. To the contrary, if the graphite material is granulated, the average particle size ratio becomes one or higher, and the tap density may also increase. The granulated particles are not preferable because of firm anticipation that the particles may return to a state before the treatment during the final molding step.

The kinetic energy treatment is to reduce the particle size so that the average particle size ratio before and after the treatment of the powder particles becomes one or less, and at the same time to control the particle shape. The kinetic energy treatment is categorized in a pulverizing treatment among technological unit manipulations useful for particle design such as pulverizing, classifying, mixing, granulating, surface modifying, reacting, and so on.

Pulverizing means exerting force to substances to reduce the size of the substances, thereby controlling the particle size, particle profile, and filling property of the substances. The pulverizing treatment is classified according to kinds of force exerted to the substances and treatment conditions. The force exerted to the substances is categorized into four: striking force (impacting force), pressing force (compressing force), mashing force (milling force), and scraping force (shearing force). Meanwhile, the treatment mode is categorized into two: volume pulverization in which cracks are generated inside the particles and propagated, and surface pulverization in which particle surfaces are scraped. The volume pulverization is proceeded with impacting force, compressing force, and shearing force, whereas the surface pulverization is proceeded will milling force and shearing force. Pulverization is a treatment in combination of a variety of kinds of force exerted to those substances and processing forms. The combination can be determined according to the treatment purpose.

Pulverization is generally made by a mechanical apparatus such as a pulverizing machine or the like, though can be made by chemical reactions such as explosion or the like or volume expansion. The pulverization treatment used for manufacturing the carbonaceous material for electrode according to the invention is preferably a treatment to finally make higher the share of surface treatments regardless use or nonuse of the volume pulverization. This is because the surface pulverization of the particles is important to introduce rounded shapes to the particle shapes by truncating the graphitized particles and carbonaceous particles. More specifically, the surface treatment may be made after the volume pulverization is proceeded to some extent, or only the surface treatment is made with almost no proceeding of the volume pulverization, or the volume pulverization and the surface pulverization can be proceeded at the same time. It is preferable to make a pulverization treatment in which surface pulverization is well made at the final stage and in which particles can be truncated from the surfaces of the particles.

An apparatus for implementing the kinetic energy treatment is selected from ones capable of treating the above preferable steps. According to studies made by the inventors, it was turned out that an apparatus giving impacting force as an essential and repeatedly mechanical operations such as compression, friction, shearing force, and so on including mutual interaction among particles is effective. More specifically, a preferable apparatus is to have a rotor having plural blades inside a casing, to provide mechanical exertions such as impact, compression, friction, shearing force, and so on to the carbonaceous material introduced inside, and to perform the surface treatment in proceeding the volume pulverization. An apparatus having a mechanism repeatedly giving mechanical exertions by circulating or rotating the carbonaceous material is more preferable.

As an example of such a preferable apparatus, a hybridization system made by Nara Kikai Seisakusho K.K. can be exemplified. Where a treatment is made in use of this apparatus, the circumference speed of the rotor to be rotated is set preferably to 30 to 100 m/sec, more preferably 40 to 100 m/sec, and further preferably 50 to 100 m/sec. The treatment can be made solely by passing the carbonaceous material, but it is preferable to treat the material in circulating or residing the material in the apparatus for 30 seconds or more and more preferable to treat the material in circulating or residing the material in the apparatus for one minute or more.

Where the true density of the carbonaceous powders as a starting material is less than 2.25, and the powders do not have a high crystallization, it is preferable to implement a thermal treatment to make the crystallization further higher after the kinetic energy treatment is done. The thermal treatment is done at 2000° C. or higher, more preferably at 2500° C. or higher, and further preferably at 2800° C.

With such a kinetic energy treatment, the graphite particles or carbonaceous particles come to have rough portions only near the particle surfaces as maintaining the high crystallization as a whole and become particles exposing disorder and edge surfaces. This increases surfaces at which lithium ions can enter and exit and allows the particles to have a high capacity even at a high current density.

As an index for crystallization of the particles and roughness of the particle surface, namely existing amount of the edge surfaces of the crystal, a plane space d002 of a (002) plane in an X-ray wide angle diffraction method, a crystallite size (Lc), an R value, as a peak intensity ratio of a peak intensity of 1360 $cm^{-1}$ to a peak intensity of 1580 $cm^{-1}$ in a Raman spectrum in use of an argon ion laser, can be used. In general, carbonaceous materials have a small amount of the plane space d002 of the (002) plane, and as the crystallite size (Lc) is larger, the R value is smaller. In other words, the graphized particles and carbonaceous particles, as a whole, have substantially the same crystal state. To the contrary, the carbonaceous material for electrode according to the invention has a small value of the plane space d002 of the (002) plane, a large crystalline size (Lc), and a large R value. That is, the carbonaceous material bulk has a high crystallization, but the crystallization around the particle surfaces (about 100 Angstroms from the particle surface) is disordered, which indicates frequent exposures of the edge surfaces.

The kinetic energy treatment introduces roundness to the particles, thereby improving the filling property of those particles.

To enhance the filling property of the powder particles, it is known that it is better to fill smaller particles that are capable of entering into spaces among particles. Filling property might be made higher in implementing pulverization or the like to the carbonaceous or graphitized particles, but in fact, filling property is generally rather lowered even where the particle size is made smaller by such a method. The reason, we think, is that pulverization makes the particle shape more irregular.

In a meantime, as the number of particles (coordination number n) in contact with a particle (principal particle) in a powder particle group is larger, the rate occupied by spaces in the filling layer is reduced. That is, as a factor to affect the filling rate, the rate of particle size and composition ratio, or namely, the particle size profile is important. This study is conducted with regard to a model-like spherical particle group, but the carbonaceous or graphitized particles before the treatment handled in this invention are in a flaky, crystalline, or plate shape, and such a high filling state can be created even where the particle size profile is controlled merely by ordinary pulverization and classification as an attempt to raise the filling rate.

Generally speaking, the carbonaceous or graphitized particles in a flaky, crystalline, or plate shape have a tendency to have a poorer filling rate as the particle size is smaller. This is, we think, because resistances to adjacent particles become larger to impair the filling property by causes that pulverization makes the particles more irregular, that the particle surfaces are formed with more projected portions such as "fibrillating", "exfoliating", "folding" and so on, and that further fine irregular particles are adhered with some intensity. If those irregularities are reduced, and if the particle shape comes close to a sphere, the filling property may not be reduced even where the particle sized is made smaller, and the tap density of the substantially the same level is to be shown theoretically in large size carbonaceous powders as well as small size carbonaceous powders.

According to the study made by the inventors, in the carbonaceous or graphitized particles whose true densities are substantially the same and whose shapes are closer to a spherical shape, it is confirmed that the tap density indicates a higher value. That is, it is important to give the particles' shape roundness and make the particles closer to the spherical shape. As the particle shape comes closer to the spherical shape, the filling property of the powders is improved largely at the same time.

In this invention, from the reasons above described, tap density is adapted for an index of the sphere degree. Where the fling property of the particles after the treatment is increased in comparison with that before the treatment, we think that this is a result of rounded particles by the used treatment method. We also think that, in this invention, it is a result of rounded particles if the tap density of the carbonaceous material obtained where treated in largely reducing the particle size is higher than the tap density of the carbonaceous material having substantially the same size obtained through a normal pulverization.

In this invention, it is possible to use graphitized particles or carbonaceous particles from which fine particles and/or rough particles are removed by classification after a kinetic energy treatment. As for the classification, the publicly known methods can be utilized.

By treating the particles as described above, graphitized particles as a starting material having an R value, as a peak intensity ratio of a peak intensity of 1360cm$^{-1}$ to a peak intensity of 1580 cm$^{-1}$ in a Raman spectrum in use of an argon ion laser, of 0.01 to 0.25, a plane space d002 of a (002) plane less than 0.337 nm in an X-ray wide angle diffraction method, and a crystallite size (Lc) of 90 nm or higher are processed, by the kinetic energy treatment, to provide a carbonaceous material for electrode as processed graphite powders having an R value, as a peak intensity ratio of a peak intensity of 1360 cm$^{-1}$ to a peak intensity of 1580 cm$^{-1}$ in a Raman spectrum in use of an argon ion laser, 1.5 times or higher, preferably twice or higher of the R value of the graphite particles before the treatment, as well as normally 10 times or lower, preferably 7 times or lower, though not specifically limited, of the R value of the graphite particles before the treatment, a plane space d002 of a (002) plane less than 0.337 nm in an X-ray wide angle diffraction method, and a crystallite size (Lc) of 90 nm or higher and a tap density of 0.75 g/cm$^3$ or higher.

Multilayer Structure Carbonaceous Material for Electrode

The multilayer structure carbonaceous material for electrode of the invention can be prepared by mixing an organic compound or organic compounds to be carbonized by a calcination step and the carbonaceous material for electrode of the invention having the above feature and by calcining the compound or compounds to be carbonized.

The organic compound to be mixed with the carbonaceous material for electrode is not specially limited in terms of kinds as far as carbonized by calcination. The compound can be an organic compound proceeding for carbonization under a liquid phase and an organic compound proceeding for carbonization under a solid phase, as well. The organic compound mixed with the carbonaceous material for electrode can be a single organic compound or a mixture of plural organic compounds.

As an organic compound proceeding for carbonization under a liquid phase, able to be used are coal tar pitch from soft pitch to hard pitch, coal based heavy oil such as coal liquefied oil, straight run based heavy oil such as asphaltene, petroleum based heavy oil such as residual based heavy oil such as naphtha tar or the like as by-production when crude oil, naphtha, and the like are thermally decomposed, thermally treated pitches such as ethylene tar pitch, FCC decant oil, Ashland pitch, and the like, which are obtainable through thermal decomposition of residual based heavy oil. Furthermore, vinyl based polymers such as polyvinyl chloride, polyvinyl acetate, polyvinyl butyral, polyvinyl alcohol, and the like, substituted phenol resins such as 3-methylphenol formaldehyde resin, 3,5-dimethylphenol formaldehyde resin, and the like, aromatic group carbon hydrides such as acenaphthene, decacyclene, anthracene, and the like, nitrogen ring compounds such as phenadine, acridine, and the like, sulfur ring compounds such as thiophene, and the like can be exemplified.

As an organic compound proceeding carbonization under a solid phase, natural polymers such as cellulose, chain vinyl resins such as polyvinylidene chloride, polyacrylonytrile, and the like, aromatic polymers such as polyphenylene, thermosetting resins such as furfuryl alcohol resin, phenolformaldehyde resin, imide resin, and the like, thermosetting resin raw materials such as furfuryl alcohol, and so on can be exemplified.

Those organic compounds can be used to be adhered to the surfaces of the powder particles upon dissolving and diluting the compounds in selection of proper solvents when necessary.

As a method for manufacturing the multilayer structure carbonaceous material for electrode according to the invention from those organic compounds and the carbonaceous material for electrode, a typical manufacturing method including the following processes can be exemplified.

[First Process]

This is a process in which the organic compounds and the carbonaceous material for electrode are mixed with solvents when necessary using various commercially available mixers and kneaders to obtain a mixture.

[Second Process] (Process Implemented when Necessary)

It is a process in which the mixture is heated as it is or in being agitated when necessary to obtain an intermediate material from which the solvents are removed.

[Third Process]

It is a process in which the mixture or the intermediate material is heated at 500 to 3000° C. in an inert gas atmosphere such as nitrogen gas, carbonate gas, argon gas, or the like or a non-oxidizing atmosphere to obtain a carbonaceous material.

[Fourth Process] (Process Implemented when Necessary)

It is a process in which the carbonaceous material is processed into powders by pulverization, fragmentation, classification, and the like.

At mixing of the first process, the solvent may or may not be used. Where a solvent is used, the kind and amount of the solvent are not specifically limited, but such solvents are preferable as dissolving the above organic compounds to be used or lowering viscosity. The temperature during a mixing process is not specifically limited, but that temperature is normally, for example, at a temperature from room temperature to 300° C. or lower, preferably at a temperature from room temperature to 200° C. or lower and more preferably at a temperature from room temperature to 100° C. or lower. In the first process, by mixing the organic compounds and the carbonaceous material for electrode, the organic compounds can be adhered to the surfaces of the powder particles of the carbonaceous material for electrode.

The heating temperature of the second process is normally at 300° C. or higher, preferably at 400° C. or higher, and more preferably at 500° C. or higher, and the upper limit is not specifically determined but can be at 3000° C. or lower, preferably 2800° C. or lower, more preferably 2500° C. or lower, and particularly preferably 1500° C. or lower. The temperature increasing rate, the cooling rate, the thermal treatment time, and the like are arbitrarily set according to the objects. After the thermal treatment is made at a relatively low temperature range, the temperature can be increased to a prescribed temperature.

The fourth process is a step for processing the material into powders by pulverization, fragmentation, classification, and the like, when necessary, but can be omitted. The fourth process can be done before the third process and can be done before and after the third process.

The reaction apparatus used in those processes can be a batch type and a continuation type. A single apparatus or plural apparatuses can be used.

A rate (hereinafter referred to as "coverage rate") of the carbonaceous material derived from the organic compounds in the multilayer structure carbonaceous material for electrode according to the invention is prepared to set normally 0.1 to 50% by weight, preferably 0.5 to 25% by weight, more preferably 1 to 15% by weight, and further preferably 2 to 10% by weight.

The multilayer structure carbonaceous material for electrode of the invention has a volume reference average particle size of 2 to 70 μm, preferably 4 to 40 μm, more preferably 5 to 35 μm, and further preferably 7 to 30 μm. The specific surface area measured by using the BET method is, for example, 0.1 to 10 $m^2/g$, and preferably 1 to 10 $m^2/g$, more preferably 1 to 7 $m^2/g$, further preferably 1 to 4 $m^2/g$. The multilayer structure carbonaceous material for electrode of the invention preferably does not has a crystallization higher than the crystallization of the carbonaceous or graphitized particles serving as nuclear in the diffraction diagram of an X-ray wide angle diffraction in which CuKα line is used a radiation source.

The multilayer structure carbonaceous material for electrode of the invention preferably has an R value as represented by a ratio [IB/IA] of a peak PB (peak intensity IB) emerging in a range of 1350 to 1370 $cm^{-1}$ to a peak PA (peak intensity IA) emerging in a range of 1580 to 1620 $cm^{-1}$, in a Raman spectrum analysis using an argon ion laser having a wavelength of 5145 $cm^{-1}$, of 0.1 to 0.7, more preferably 0.20 to 0.7, further preferably 0.25 to 0.6. The tap density is preferably controlled to be in a range of 0.70 to 1.40 $g/cm^3$, preferably 0.75 to 1.40 $g/cm^3$, and more preferably 0.85 to 1.40 $g/cm^3$. The multilayer structure may improve the tap density of the carbonaceous material for electrode serving as nuclear and may bring effects to introduce roundness to the shapes of the material.

The carbonaceous material for electrode according to the invention has rough particle surfaces, and therefore, when used for the multilayer structure carbonaceous material for electrode of the invention, the material may bring an effect to raise binding property to the covered carbonaceous material.

Electrode

Electrodes can be manufactured using the carbonaceous material for electrode or the multilayer structure carbonaceous material for electrode according to the invention. Particularly, the multilayer structure carbonaceous material for electrode according to the invention can be used very preferably for manufacturing the electrodes. The manufacturing method is not specifically limited, and the electrodes can be manufactured according to methods generally used. As a typical method, a method can be exemplified in which binders and solvents are added to the carbonaceous material for electrode or the multilayer structure carbonaceous material for electrode to render the material in a slurry state and in which the obtained slurry is coated on a metal current collector substrate such as a copper foil or the like and dried.

Filling density of the plate may be improved by giving pressure to the coated and dried carbonaceous material for electrode or the multilayer structure carbonaceous material for electrode by means of press rollers, compression molding apparatuses or the like, so that the electrode amount per unit volume can be increased. The carbonaceous material for electrode or the multilayer structure carbonaceous material for electrode can be molded into electrode shapes by a method for compression molding or the like.

As a binder to be used for manufacturing electrode, exemplified are resin based polymers such as polyethylene, polypropylene, polyethylene terephthalate, aromatic polyamide, cellulose, and the like, rubber type polymers such as styrene butadiene rubber, isoprene rubber, butadiene rubber, ethylene propylene rubber, and the like, thermoplastic elastomeric polymers such as styrene-butadiene-styrene block copolymer and its hydrogen added polymer, styrene-ethylene-butadiene-styrene copolymer, styrene-isoprene-styrene block copolymer and its hydrogen added polymer, and the like, soft resin polymers such as syndiotactic 1,2-polybutadiene, ethylene-vinyl acetate copolymer, porpylene-α olefin (carbon number 2 to 12) copolymer, and the like, fluoric polymer such as polyvinylidene fluoride, vinylidene fluoride-hexachloropropylene copolymer, polytetrafluoroethylene, polytetrafluoroethylene-ethylene copolymer, and the like, and furthermore, a polymeric composition having ionic conductance of lithium ions may be exemplified.

As a polymer having ionic conductance, polyether based polymeric compounds such as polyethylene oxide, polypropylene oxide, and the like, bridged polymers such as polyether compounds, materials composited with lithium salt or alkali metal salt having lithium as essential to polymers such as polyepichlorohydrin, polyphosphagen, polysiloxane, polyvinyl pyrrolidone, polyvinylidene carbonate, polyacrylonitril, and the like, materials blended to those materials with organic compounds having a high permittivity such as propylene carbonate, ethylene carbonate, γ-butyrolactone, and the like and organic compounds of a low viscosity such as straight chain carbonate or the like. The ionic conductive polymer compound thus described has an ion conductivity of $10^{-5}$ s/cm or higher or more preferably $10^{-3}$ s/cm or higher at a room temperature.

Various forms can be taken by the mixture of the carbonaceous material for electrode or the multilayer structure carbonaceous material for electrode and the binder. For example, exemplified are a form that both particles are mixed, a form that the mixture is formed by linking fibrous binders with particles of the carbonaceous material, a form that a layer of the binders is adhered to the particle surfaces of the carbonaceous material, and the like. The mixing rate of both materials, the binder to the carbonaceous material for electrode or the multilayer structure carbonaceous material for electrode, is preferably 0.1 to 30% by weight, more preferably 0.5 to 10% by weight. If binders of 30% by weight or higher are added, the electrode has a large internal resistance, and conversely, if binders of 0.1% by weight or lower are added, the carbonaceous material for electrode or the multilayer structure carbonaceous material for electrode may suffer from a tendency to lose binding property with the current collector.

The electrode made of the carbonaceous material for electrode or the multilayer structure carbonaceous material for electrode according to the invention has a density (hereinafter referred to as "electrode density") of active substance layer on the pressed electrode by means of roller pressing or compression molding of 0.5 to 1.7 g/cm$^3$, preferably 0.7 to 1.6 g/cm$^3$, more preferably 0.7 to 1.55 g/cm$^3$, and thereby can bring a capacity to the maximum extent per unit area of the battery without losing high efficiency discharging and low temperature characteristics. In the carbonaceous material for electrode or the multilayer structure carbonaceous material for electrode according to the invention at that time, the charging and discharging capacity is high since the particle inside has a high crystallization; since the particle surface is in a rough state, or namely since the particles are in a state that edge portions are exposed from the particle surfaces or in a shape to increase the existing amount of the edge portions (that upon pulverized in a direction perpendicular to the surface of the plate particles, the particles become relatively thicker in the thickness direction in the particle, or namely the particles have a shape that edge portions more frequently appear.), areas, to which lithium ions are doped or removed, of the carbonaceous material particles of the carbonaceous material for electrode or the multilayer structure carbonaceous material for electrode are increased. Where the tap density is high, or where the carbonaceous material is close to a spherical shape, spaces in the electrodes are less sealed, and therefore, the lithium ions, we think, can be diffused more smoothly.

Secondary Battery

The carbonaceous material for electrode or the multilayer structure carbonaceous material for electrode according to the invention is useful as an electrode for battery. Particularly, it is very useful for an anode material of a non-aqueous solvent secondary battery such as a lithium secondary battery. For example, a non-aqueous solvent secondary battery structured in combination of an anode produced according to the above method, a metal chalcogenide based cathode for lithium ion battery ordinarily used, and an organic electrolyte having a carbonate based solvent as essential component has a large capacity, a small irreversible capacity admitted in an initial cycle, a high quick charging and discharging capacity, an excellent cycling property, good storing property of the battery where the battery is left over at a high temperature, a high reliability, a high efficiency discharging characteristics, and excellent discharging characteristics at a low temperature.

Selection of necessary members for structuring the battery such as cathode, electrolyte, and the like, which constitute the non-aqueous solvent secondary battery is not specifically limited. Hereinafter, materials for members constituting the non-aqueous solvent secondary battery are exemplified, but materials to be used are not limited to those examples.

For the cathode constituting the non-aqueous solvent secondary battery according to the invention, for example, lithium transition metal composite oxide materials such as lithium cobalt oxide, lithium nickel oxide, lithium manganese oxide, and the like, transition metal oxide materials such as manganese dioxide, and the like, carbonaceous materials such as fluoric graphite and the like, which can absorb and discharge lithium, can be used. More specifically, $LiFeO_2$, $LiCoO_2$, $LiNiO_2$, $LiMn_2O_4$, and atypical compound of those materials, $MnO_2$, $TiS_2$, $FeS_2$, $Nb_3S_4$, $Mo_3S_4$, $CoS_2$, $V_2O_5$, $P_2O_5$, $CrO_3$, $V_3O_3$, $TeO_2$, $GeO_2$, and the like can be used.

The manufacturing method for cathode is not specifically limited. The cathode can be manufactured in substantially the same manner as the manufacturing method for electrode.

The cathode current collector used in this invention is preferably made of a valve metal or its alloy for forming a passive state cover film on the surface by anode oxidation in the electrolyte. As a valve metal, exemplified are metals belonging to IIIa, IVa, Va groups (3B, 4B, 5B groups) and alloys of those. More specifically, Al, Ti, Zr, Hf, Nb, Ta, alloys containing those metals, and the like can be exemplified. Metals of Al, Ti, Ta, and alloys containing those metals, can be preferably used. Particularly, Al and its alloy are desirable because of light weight to make the energy density higher.

As an electrolyte used for the non-aqueous solvent secondary battery according to the invention, a solute (electrolyte) solved in a non-aqueous solvent can be used. As a solute, alkali metal salts, quaternary ammonium salts, and the like can be used. More specifically, one or more compounds selected from a group of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$ can be preferably used.

As a non-aqueous solvent, ring carbonates such as ethylene carbonate, propylene carbonate, butylene carbonate, vinylene carbonate, and the like, ring ester compounds such as γ-butyrolactone, and the like chain ethers such as 1,2-dimethoxyethan, ring ethers such as crown ether, 2-methyltetrahydrofuran, 1,2-dimethyltetrahydrofuran, 1,3-dioxosilane, tetrahydrofuran, and the like, chain carbonates such as diethyl carbonate, ethylmethyl carbonate, dimethyl carbonate, and the like can be used. For the solvent and solute, each one type may be selected and used, or two or more types may be used upon mixed. The non-aqueous solvent among those preferably contains the ring carbonate and chain carbonate.

The material and shape of the separator used for the non-aqueous solvent secondary battery according to the invention are not specifically limited. The separator is to separate the anode and the cathode from each other as not to contact physically with each other, and preferably has a high ion permeability and a low electric resistance. The separator preferably selected from materials that are stable against the electrolyte and has a good liquid persevering property. More specifically, a porous sheet or non-woven sheet whose starting material is a polyolefin such as polyethylene, polypropylene, and the like is used, to which the electrolyte can be impregnated.

The manufacturing method for the invented non-aqueous solvent secondary battery at least having the non-aqueous electrolyte, the anode, and the cathode is not specifically limited and can be selected properly from methods generally used. The non-aqueous solvent secondary battery according to the invention can be formed, in addition to the non-aqueous electrolyte, the anode, and the cathode, with an outer container, a separator, a gasket, a sealing opening plate, a cell casing, and the like. With the manufacturing method, an anode is placed on the outer container, and the electrolyte and the separator are placed on the anode. The cathode is mounted as to be opposed to the anode and caulked together with the gasket and the sealing opening plate to produce a battery. The shape of the battery is not specifically limited, and can be a cylinder type in which the sheet electrodes and the separator are made in a spiral form, a cylinder type of an inside-out structure in which the pellet electrodes and the separator are combined, a coin type in which the pellet electrodes and the separator are stacked, and so on.

This invention is further described in raising Examples. Materials, used amounts, rates, manipulations, and the like described in Examples below can be modified as far as such a modification does not go beyond the subject matter of the invention. Accordingly, the scope of the invention is not limited to Examples described below.

EXAMPLE 1

Graphite materials of prescribed amounts as set forth in Table 1 were treated with treatment conditions as set forth in Table 1, thereby preparing carbonaceous materials for electrode of eighteen types. The kinds of the graphite materials used as the starting material are as shown in Table 3. The results measured by a method for measuring property of the prepared carbonaceous materials of eighteen types as described below are shown in Table 1.

| carbonaceous material for electrode No. | Graphite starting material type | Treatment amount | Apparatus | Rotor circumferential speed (m/sec) | Treatment time (min) | Average particle size ($\mu$m) | d002 (nm) | BET Specific surface area ($m^2/g$) | Tap density ($g/cm^3$) | Lc (nm) | True density ($g/cm^3$) | Raman R value | Raman 1580 Half value width ($cm^{-1}$) | Average circle degree | Raman G value |
|---|---|---|---|---|---|---|---|---|---|---|---|---|---|---|---|
| 1 (the invention) | A | 100 g | a | 60 | 3 | 16.6 | 0.336 | 10.0 | 0.83 | >100 | 2.26 | 0.29 | 22.6 | 0.944 | — |
| 2 (the invention) | A | 100 g | a | 60 | 5 | 9.9 | 0.336 | 11.1 | 0.85 | >100 | 2.23 | 0.29 | 24.0 | — | — |
| 3 (the invention) | A | 100 g | a | 80 | 3 | 14.5 | 0.336 | 12.0 | 0.78 | >100 | 2.26 | 0.29 | 23.0 | — | — |
| 4 (the invention) | A | 100 g | a | 100 | 5 | 5.0 | 0.336 | 17.6 | 0.82 | >100 | 2.22 | 0.45 | 23.3 | 0.971 | — |
| 5 (the invention) | B | 100 g | a | 60 | 3 | 15.4 | 0.336 | 7.4 | 0.91 | >100 | 2.27 | 0.30 | 21.9 | — | — |
| 6 (the invention) | B | 100 g | a | 100 | 5 | 5.4 | 0.336 | 15.0 | 0.77 | >100 | 2.27 | 0.44 | 24.0 | 0.943 | — |
| 7 (the invention) | D | 500 g | b | 70 | 3 | 16.4 | 0.336 | 7.1 | 0.93 | >100 | 2.26 | 0.28 | 21.3 | — | — |
| 5 (the invention) | E | 500 g | b | 70 | 4 | 15.9 | 0.336 | 7.4 | 0.96 | >100 | 2.27 | 0.28 | 21.4 | 0.946 | — |
| 9 (the invention) | F | 90 g | a | 70 | 3 | 17.5 | 0.336 | 7.5 | 0.82 | >100 | 2.26 | 0.25 | 23.0 | 0.945 | 1.9 |
| 10 (the invention) | F | 90 g | a | 95 | 3 | 10.0 | 0.336 | 12.1 | 0.81 | >100 | 2.26 | 0.33 | 23.4 | 0.960 | 1.5 |
| 11 (the invention) | F | 600 g | b | 70 | 3 | 19.2 | 0.336 | 6.5 | 0.83 | >100 | 2.26 | 0.25 | 22.5 | 0.945 | — |
| 12 (the invention) | F | 600 g | b | 95 | 3 | 10.1 | 0.336 | 10.8 | 0.80 | >100 | 2.26 | 0.28 | 21.8 | 0.960 | — |
| 13 (the invention) | F | 90 g | a | 85 | 1 | 18.1 | 0.336 | 6.8 | 0.76 | >100 | 2.26 | 0.22 | 22.3 | — | 2.4 |
| 14 (the invention) | G | 90 g | a | 65 | 3 | 18.0 | 0.336 | 6.7 | 0.83 | >100 | 2.26 | 0.23 | 25.1 | — | 2.2 |
| 15 (the invention) | H | 90 g | a | 65 | 6 | 17.4 | 0.336 | 8.4 | 0.95 | >100 | 2.25 | 0.25 | 26.0 | — | 2.1 |
| 16 | A | 60 kg/hr | c | 120 | pass | 15.3 | 0.336 | 9.3 | 0.47 | >100 | 2.26 | 0.15 | 21.5 | 0.938 | — |
| 17 | A | 150 kg/hr | c | 104 | pass | 20.5 | 0.336 | 7.4 | 0.56 | >100 | 2.26 | 0.15 | 21.5 | — | 3.5 |
| 18 | C | — | — | — | — | 18.6 | 0.336 | 5.7 | 0.71 | >100 | 2.27 | 0.24 | 21.0 | — | — |

(Note)
Apparatus a: Hybritization System NHS-1 type made by Nara Kikai Seisakusho K.K.
Apparatus b: Hybritization System NHS-3 type made by Nara Kikai Seisakusho K.K.
Apparatus c: T-400 type Turbomill (4J type) made by Turbo Kogyou Sha K.K.

EXAMPLE 2

A carbonaceous material of 3 kg as described in Table 2 and a petroleum tar 1 kg were introduced in a Lödige mixer M-20 Model made by Gebr der Lödige Maschinenbau (inner volume of 20 liters) and kneaded. The material was heated up to 700° C. in a nitrogen atmosphere, and after the tar was removed, the material was heated up to 1300° C. and thermally treated. The obtained thermally processed material was milled with a pin mill and classified for removing rough particles, thereby preparing a multilayer structure carbonaceous material for electrode of thirteen types at the final step. The results measured by a method for measuring property of the prepared multilayer structure carbonaceous material for electrode of thirteen types as are shown in Table 2.

TABLE 2

| | | Property of multilayer structure carbonaceous material for electrode | | | | | |
|---|---|---|---|---|---|---|---|
| Multilayer structure carbonaceous material for electrode No. | carbonaceous material as a starting material | Raman R value | Raman 1580 Half value width ($cm^{-1}$) | Tap density ($g/cm^3$) | BET Specific surface area ($m^2/g$) | Average particle size ($\mu m$) | Coverage rate (weight %) |
| 1 (the invention) | carbonaceous material for electrode 1 | 0.33 | 26.0 | 0.90 | 3.6 | 19.2 | 4.4 |
| 2 (the invention) | carbonaceous material for electrode 5 | 0.35 | 27.8 | 0.93 | 3.3 | 20.5 | 4.5 |
| 3 (the invention) | carbonaceous material for electrode 7 | 0.43 | 30.4 | 0.97 | 3.0 | 22.4 | 6.0 |
| 4 (the invention) | carbonaceous material for electrode 8 | 0.41 | 31.9 | 0.88 | 3.3 | 18.7 | 5.5 |
| 5 (the invention) | carbonaceous material for electrode 9 | 0.28 | 30.5 | 0.93 | 3.0 | 22.2 | 5.0 |
| 6 (the invention) | carbonaceous material for electrode 10 | 0.29 | 30.4 | 0.98 | 4.3 | 14.7 | 4.9 |
| 7 (the invention) | carbonaceous material for electrode 11 | 0.37 | 29.9 | 0.95 | 2.6 | 22.7 | 4.9 |
| 8 (the invention) | carbonaceous material for electrode 12 | 0.42 | 32.4 | 0.95 | 3.7 | 14.3 | 5.0 |
| 9 (the invention) | carbonaceous material for electrode 13 | 0.27 | 29.5 | 0.87 | 3.0 | 24.1 | 5.0 |
| 10 (the invention) | carbonaceous material for electrode 14 | 0.28 | 30.0 | 0.95 | 2.5 | 21.9 | 4.9 |
| 11 (the invention) | carbonaceous material for electrode 15 | 0.37 | 30.0 | 0.95 | 3.3 | 19.0 | 4.9 |
| 12 | carbonaceous material for electrode 16 | 0.24 | 25.0 | 0.80 | 3.6 | 19.8 | 4.9 |
| 13 | Graphitized material C | 0.30 | 28.4 | 0.81 | 3.0 | 26.8 | 4.5 |

Details of the graphite materials used in Examples 1, 2 are shown in Table 3 below.

TABLE 3

| Graphite material | Derivation | d002 (nm) | Lc (nm) | Raman R value | Raman 1580 Half value width ($cm^{-1}$) | Tap density ($g/cm^1$) | True density ($g/cm^{1)}$) | Average particle size ($\mu m$) |
|---|---|---|---|---|---|---|---|---|
| A | Petroleum based artificial graphite | 0.336 | >100 | 0.15 | 21.6 | 0.56 | 2.26 | 27.1 |
| B | Natural graphite | 0.336 | >100 | 0.19 | 21.2 | 0.70 | 2.27 | 26.8 |
| C | Natural graphite | 0.336 | >100 | 0.24 | 21.0 | 0.71 | 2.27 | 18.6 |
| D | Natural graphite | 0.336 | >100 | 0.13 | 21.0 | 0.46 | 2.27 | 28.7 |
| E | Natural graphite | 0.336 | >100 | 0.15 | 19.6 | 0.75 | 2.27 | 61.1 |
| F | Petroleum based artificial graphite | 0.336 | >100 | 0.13 | 19.1 | 0.44 | 2.26 | 36.7 |
| G | Petroleum based artificial graphite | 0.336 | >100 | 0.09 | 22.9 | 0.52 | 2.26 | 26.3 |
| H | Petroleum based artificial graphite | 0.336 | >100 | 0.05 | 21.0 | 0.47 | 2.25 | 100.0 |

The followings are property measuring methods of the prepared carbonaceous materials in Examples 1, 2.

(1) X-ray Diffraction

X-ray standard high purity silicon powders of about 15% were added to a carbonaceous material for electrode and mixed with the carbonaceous material, and the obtained mixed material was filled in a specimen cell. The wide angle X-ray diffraction curve was measured by the reflection system diffractometer method with CuKα line monochromated by a graphite monochrometer as a radiation source, and plane spacing (d002) and crystallite size (Lc) were obtained by a Gakusin method.

(2) Raman Analysis

A Raman spectrum analysis was made in use of NR-1800, made by Nihon Bunkou Sha. The analysis was made using an argon ion laser having a wavelength of 514.5 nm; the laser power was set at 30 mW; exposure time was set for 75 seconds. The laser power was 30 mW at the light source and 18 mW at the measured specimen due to laser beam attenuation in the optical path between the light source and the specimen. Filling of specimen into a measured cell was conducted by free falling the carbonaceous material for electrode, and the measurement was made in radiating the laser beam onto the specimen surface in the cell and in rotating the cell in a plane perpendicular to the laser beam. Intensity IA of the peak PA around 1580 $cm^{-1}$ and intensity IB of the peak PB around 1360 $cm^{-1}$ of the obtained Raman spectrum were measured, and the intensity ratio (R=IB/IA) and a half value width of the peak around 1580 $cm^{-1}$ were measured. Moreover, an area of the peak PA around 1580 $cm^{-1}$ (integrated value of 1480 to 1680 $cm^{-1}$) is defined as YA, where an area of the peak PB around 1360 $cm^{-1}$ (integrated value of 1260 to 1460 $cm^{-1}$) is defined as YB, and the area ratio value G (=YA/YB) was measured.

(3) Tap Density

Using a powder density measuring apparatus (Tap denser KYT-3000 made by Seishin Enterprise Co., Ltd), where a sieve having a sieve opening of 300 μm as a sieve filtering the carbonaceous material for electrode was used, tap density was measured where taps of stroke length of 10 mm were made 1,000 times after the powders were dropped in the tap cell of 20 $cm^3$ to fill the cell fully.

(4) True Density

Using a 1% surfactant solution, it was measured by a liquid phase substitution method by a pycnometer.

(5) BET Specific Surface Area

Using AMS-8000 made by Okura Riken Sha, the materials were heated up at 350° C. for preliminary drying, and after purging nitrogen gas for 15 minutes, it was measured by BET one point method through nitrogen gas absorption.

(6) Average Particle Size

A solution of polyoxyethylene (20) sorbitane monolaurate of 2% by volume (approximately 1 ml) as a surfactant was mixed to the carbonaceous material for electrode, and the average particle size (median diameter) of volume reference was measured with a laser diffraction type particle size profile meter (LA-700 made by Horiba Seisakusho) where an ion exchanged water was used as a dispersion medium.

(7) Average Circle Degree

Using a flow type particle image analyzer (FPIA-2000 made by Toaiyoudenshisha), particle profile from circle equivalent diameters was measured, and circle degree was calculated. An ion exchanged water was used as a dispersion medium, and a solution of polyoxyethylene (20) sorbitane monolaurate as a surfactant was used. The circle equivalent diameter is defined as a diameter of a circle (equivalent circle) having the same projected area as the image of the pictured particle; the circle degree is a rate in which the peripheral length of the equivalent circle is set as a numerator whereas the peripheral length of the projected image of the pictured particle is set as a denominator. The circle degrees of all measured particles are averaged to calculate the average circle degree.

(8) Coverage Rate of the Multilayer Structure Carbonaceous Material for Electrode The coverage rate of the multilayer structure carbonaceous material for electrode was sought according to the following formula.

$$\text{Coverage rate (weight \%)}=100-(K\times D)/(N\times(K+T))\times 100$$

In the above formula, K denotes weight (kg) of the carbonaceous material; T denotes weight (kg) of petroleum tar; D denotes weight (kg) of kneaded materials before removal of tar (second process); N denotes a recycled amount (kg) of thermally treated materials after the thermal treatment (third process).

EXAMPLE 3

A semi-battery was produced using a prepared carbonaceous material and its charging and discharging property was tested.

(1) Production of a Semi-battery

A carbonaceous material of 5 g added with dimethylacetoamide solution of polyvinylidene fluoride of 10% by weight as solid conversion basis was stirred to obtain a slurry. The slurry was coated on a copper foil by a doctor blade method and then preliminarily dried at 80° C. A roller pressing machine pressed the dried material so that the density of the resultant electrode becomes 1.4 $g/cm^3$ or 1.5 $g/cm^3$, and the material was cut out into a disc shape of 12.5 mm in diameter, thereby creating an electrode upon drying with reduced pressure at 110° C. Subsequently, the electrode and a lithium metal electrode are placed in opposed to each other with respect to a separator impregnated with an electrolyte, as a center, to produce a coin cell. A charging and discharging test was implemented. As an electrolyte, a lithium perchlorate was dissolved at a rate of 1.5 mol per liter in a solvent in which ethylene carbonate and diethyl carbonate are mixed at a rate of 2:8 by weight ratio and used.

(2) Measurement of Irreversible Capacity

Where charging was made at current density of 0.16 $mA/cm^2$ to 0 V (lithium ion doping to electrode), and where discharging was subsequently made at current density 0.33 $mA/cm^2$ to 1.5 V (lithium ion removal from electrode), the irreversible capacity was sought by substituting the discharging capacity of the first time from the charging capacity of the first time.

(3) Measurement of Discharging Capacity and Discharging Rate Characteristics (Quick Discharging Characteristics)

Upon three time repeating the charging made at current density of 0.16 $mA/cm^2$ to 0 V and discharging made at current density 0.33 $mA/cm^2$ to 1.5 V, the discharging capacity at the third time was set as "discharging capacity." Subsequently, charging was made at current density of 0.16 $mA/cm^2$ to 0 V, and discharging was made at current density 2.8 $mA/cm^2$ and 5.0 $mA/cm^2$ to 1.5 V, respectively. The obtained capacity was determined as discharging capacities at current density 2.8 $mA/cm^2$ and 5.0 $mA/cm^2$ and was used as an index for quick discharging characteristics.

The following Table 4 shows concisely the test results.

TABLE 4

| Carbonaceous material | Electrode density (g/cm³) | Irreversible capacity of first time (mAh/g) | 0.33 mA/cm³ Discharging capacity (mAh/g) | 2.8 mA/cm³ Quick discharging capacity (mAh/g) | 5.0 mA/cm³ Quick discharging capacity (mAh/g) |
|---|---|---|---|---|---|
| carbonaceous material for electrode No. 1 (the invention) | 1.4 | 33 | 348 | 340 | 287 |
| carbonaceous material for electrode No. 5 (the invention) | 1.4 | 32 | 347 | 337 | 292 |
| carbonaceous material for electrode No. 8 (the invention) | 1.4 | 30 | 350 | 345 | 321 |
| carbonaceous material for electrode No. 17 | 1.4 | 30 | 356 | 354 | 268 |
| Multilayer structure carbonaceous material for electrode No. 1 (the invention) | 1.5 | 26 | 351 | 345 | 283 |
| Multilayer structure carbonaceous material for electrode No. 2 (the invention) | 1.5 | 25 | 345 | 349 | 313 |
| Multilayer structure carbonaceous material for electrode No. 3 (the invention) | 1.5 | 18 | 346 | 341 | 315 |
| Multilayer structure carbonaceous material for electrode No. 4 (the invention) | 1.5 | 24 | 341 | 340 | 321 |
| Multilayer structure carbonaceous material for electrode No. 5 (the invention) | 1.5 | 19 | 342 | 342 | 323 |
| Multilayer structure carbonaceous material for electrode No. 6 (the invention) | 1.5 | 26 | 342 | 342 | 332 |
| Multilayer structure carbonaceous material for electrode No. 7 (the invention) | 1.5 | 17 | 348 | 343 | 319 |
| Multilayer structure carbonaceous material for electrode No. 8 (the invention) | 1.5 | 23 | 349 | 348 | 327 |
| Multilayer structure carbonaceous material for electrode No. 9 (the invention) | 1.5 | 17 | 344 | 343 | 307 |
| Multilayer structure carbonaceous material for electrode No. 10 (the invention) | 1.5 | 25 | 345 | 344 | 313 |
| Multilayer structure carbonaceous material for electrode No. 11 (the invention) | 1.5 | 22 | 349 | 347 | 337 |
| Multilayer structure carbonaceous material for electrode No. 12 | 1.5 | 26 | 332 | 325 | 253 |
| Multilayer structure carbonaceous material for electrode No. 13 | 1.5 | 28 | 343 | 333 | 259 |

Using the carbonaceous material No. 11 for electrode prepared in Example 1, classification was made with a pneumatic classification machine [MC-100] made by Seishin Enterprise Co., Ltd under the condition in which fine particles of 25% by weight and rough particles of 22% by weight were removed respectively, thereby obtaining a resultant carbonaceous material for electrode, after classification, having property of an average particle size of 20.8 μm, a plane space d002 of 0.336 nm, a BET specific surface area of 5.3 m²/g, a tap density of 0.82 g/cm³, a crystallite size (Lc) of higher than 100 nm, a true density of 2.26 g/cm³, a Raman R value of 0.25, and a Raman 1580 half value width of 22.0 cm⁻¹.

A test was implemented in the same way as set forth in Example 2 except for the use of the carbonaceous material for electrode to obtain a multilayer structure carbonaceous material for electrode having the following property: a Raman R value of 0.37, a Raman 1580 half value width of 29.5 cm⁻¹, a tap density of 0.99 g/cm³, a BET specific surface area of 2.3 m²/g, an average particle size of 24.6 μm, and a coverage rate of 4.9% by weight.

A semi-battery was produced in the same way as set forth in Example 3 except for the use of the multilayer structure carbonaceous material obtained above, and its charging and discharging property was tested. As a result, such favorable characteristics was shown as having an electrode density of 1.5 g/cm³, an irreversible capacity of first time of 17 mAh/g, a 0.33 mA/cm³ discharging capacity of 352 mAh/g, a 2.8 mA/cm³ quick discharging capacity of 351 mAh/g, and a 5.0 mA/cm³ quick discharging capacity of 334 mAh/g.

The battery using the carbonaceous material for electrode or the multilayer structure carbonaceous material for electrode according to the invention has features such as a large capacity (discharging capacity of 0.33 mA/cm²), a small irreversible capacity admitted in the initial cycle, a excellent capacity maintaining rate of the cycle. Particularly, the quick charging and discharging characteristics (5.0 mA/cm² quick discharging characteristics) is largely improved. The battery has a good preservation property and reliability when left over at a high temperature, and a good discharging property at a low temperature. Therefore, the carbonaceous material for electrode or the multilayer structure carbonaceous material for electrode according to the invention can be used effectively for manufacturing batteries, typically, e.g., a lithium battery and the like.

What is claimed is:

1. A carbonaceous material for electrode comprising a plane space d002 of a (002) plane less than 0.337 nm in an X-ray wide angle diffraction method, a crystallite size (Lc) of 90 nm or higher, an R value, as a peak intensity ratio of a peak intensity of 1360 cm⁻¹ to a peak intensity of 1580 cm⁻¹ in a Raman spectrum in use of an argon ion laser, of 0.20 or higher, and a tap density of 0.75 g/cm³ or higher.

2. The carbonaceous material for electrode according to claim 1, wherein the carbonaceous material has a true density of 2.21 g/cm³ or higher.

3. The carbonaceous material for electrode according to claim 1, wherein the carbonaceous material has a BET specific surface area of 18 m²/g or lower.

4. The carbonaceous material for electrode according to claim 1, wherein the carbonaceous material has an average particle size of 2 to 50 μm.

5. The carbonaceous material for electrode according to claim 1, wherein the carbonaceous material has a half value width of a peak of 1580 cm$^{-1}$ in the Raman spectrum in use of the argon ion laser, of 20 cm$^{-1}$ or higher.

6. The carbonaceous material for electrode according to claim 1, wherein the carbonaceous material has an average circle degree of 0.94 or higher.

7. The carbonaceous material for electrode according to claim 1, wherein the carbonaceous material is manufactured by a kinetic energy treatment given to the carbonaceous material in a way that the average particle ratio before and after the treatment becomes one or less.

8. The carbonaceous material for electrode according to claim 7, wherein the carbonaceous material is flake graphite or crystalline graphite.

9. The carbonaceous material for electrode according to claim 7, wherein the carbonaceous material is graphitized powders or carbonaceous powders which have a plane space d002 of the (002) plane less than 0.340 nm in the X-ray wide angle diffraction method, a crystallite size (Lc) of 30 nm or higher, and a true density of 2.25 g/cm$^3$ or higher.

10. The carbonaceous material for electrode according to claim 9, wherein the carbonaceous material is graphitized powders or carbonaceous powders which have a plane space d002 of the (002) plane less than 0.337 nm in the X-ray wide angle diffraction method, a crystallite size (Lc) of 90 nm or higher, and an average particle size of 10 μm or higher.

11. The carbonaceous material for electrode according to claim 7, wherein the R value is 1.5 times larger by application of the kinetic energy treatment.

12. A multilayer structure carbonaceous material for electrode manufactured by the steps of:

mixing the carbonaceous material for electrode as set forth in claim 1 with at least one organic compound; and carbonizing the organic compound.

13. The multilayer structure carbonaceous material for electrode according to claim 12, manufactured by at least two steps of:

obtaining a mixture by mixing the carbonaceous material for electrode and the organic compound with a solvent when necessary; and carbonizing the organic compound by heating up the obtained mixture at a temperature of 500 to 3000° C. in an inert gas atmosphere or non-oxidizing atmosphere.

14. The multilayer structure carbonaceous material for electrode according to claim 13, wherein carbonizing step is performed after the solvent is removed by heating the mixture after the mixture is obtained.

15. The multilayer structure carbonaceous material for electrode according to claim 13, wherein the obtained carbonaceous material is pulverized after the carbonizing step.

16. A non-aqueous solvent secondary battery comprising:

an anode containing a carbonaceous material capable of absorbing and discharging lithium;

a cathode; and a non-aqueous electrolyte made of a solute and a non-aqueous solvent, wherein the carbonaceous material is at least partly made of the carbonaceous material for electrode as set forth in claim 1.

17. A non-aqueous solvent secondary battery comprising:

an anode containing a carbonaceous material capable of absorbing and discharging lithium;

a cathode; and a non-aqueous electrolyte made of a solute and a non-aqueous solvent, wherein the carbonaceous material is at least partly made of the multilayer structure carbonaceous material for electrode as set forth in claim 12.

18. The non-aqueous solvent secondary battery according to claim 17, wherein the solute is one or more compounds selected from a group of LiClO$_4$, LiPF$_6$, LiBF$_4$, LiCF$_3$SO$_3$, LiN(CF$_3$SO$_2$)$_2$, LiN(CF$_3$CF$_2$SO$_2$)$_2$, LiN(CF$_3$SO$_2$)(C$_4$F$_9$SO$_2$), and LiC(CF$_3$SO$_2$)$_3$.

19. The non-aqueous solvent secondary battery according to claim 17, wherein the non-aqueous solvent contains ring carbonate and chain carbonate.

20. (New) The carbonaceous material for electrode according to claim 2, wherein the carbonaceous material has a tap density of 0.80 to 1.40 g/cm$^3$ and has an average circle degree of 0.94 or higher.

* * * * *